US012688007B2

(12) United States Patent
Jeong et al.

(10) Patent No.: US 12,688,007 B2
(45) Date of Patent: Jul. 21, 2026

(54) DISPLAY APPARATUS AND OPERATING METHOD THEREFOR

(71) Applicant: LG ELECTRONICS INC., Seoul (KR)

(72) Inventors: Hyojeong Jeong, Seoul (KR); Eunjung Lee, Seoul (KR); Taeyoung Kim, Seoul (KR); Kyungnam Bae, Seoul (KR); Byounghyun Shin, Seoul (KR); Jeonghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 18/575,546

(22) PCT Filed: Aug. 2, 2021

(86) PCT No.: PCT/KR2021/010047
§ 371 (c)(1),
(2) Date: Dec. 29, 2023

(87) PCT Pub. No.: WO2023/013793
PCT Pub. Date: Feb. 9, 2023

(65) Prior Publication Data
US 2024/0319958 A1 Sep. 26, 2024

(51) Int. Cl.
*G06F 3/16* (2006.01)
(52) U.S. Cl.
CPC ..................................... *G06F 3/165* (2013.01)
(58) Field of Classification Search
None
See application file for complete search history.

(56) References Cited

U.S. PATENT DOCUMENTS 11,190,851 B1 * 11/2021 Palaniswami ......... G10L 15/005
2013/0315038 A1 * 11/2013 Ferren ................ H04N 5/44504
367/197

(Continued)

FOREIGN PATENT DOCUMENTS

JP 2004-120652 4/2004
JP 2019-129388 8/2019

(Continued)

OTHER PUBLICATIONS

PCT International Application No. PCT/KR2021/010047, International Search Report dated Apr. 27, 2022, 4 pages.

(Continued)

*Primary Examiner* — Duc Nguyen
*Assistant Examiner* — Assad Mohammed
(74) *Attorney, Agent, or Firm* — LEE, HONG, DEGERMAN, KANG & WAIMEY

(57) ABSTRACT

The present disclosure is to solve a problem that, when sound is not output because a sound output device is changed, this is mistaken as a defect of a display apparatus, and the present disclosure may comprise: a display which outputs an image; an audio output unit which outputs sound according to the image through an internal speaker, a wired connection device, or a wireless connection device; and a control unit which obtains audio through a microphone when a connection with the wireless connection device is released, and outputs a message requesting confirmation of settings of the sound output device on the basis of a change in audio volume level.

10 Claims, 9 Drawing Sheets

(56)     References Cited

U.S. PATENT DOCUMENTS

| | | | |
|---|---|---|---|
| 2015/0373393 A1 * | 12/2015 | Lee | H04N 21/41265 |
| | | | 704/275 |
| 2016/0295279 A1 * | 10/2016 | Srinivasan | H04H 60/65 |
| 2017/0041724 A1 | 2/2017 | Master et al. | |
| 2018/0302716 A1 | 10/2018 | Takasu et al. | |
| 2019/0052961 A1 | 2/2019 | Yun et al. | |
| 2019/0297373 A1 | 9/2019 | Nakajima | |
| 2020/0264834 A1 * | 8/2020 | Mori | H04N 23/62 |
| 2021/0306694 A1 * | 9/2021 | Yoo | H04N 21/4852 |

FOREIGN PATENT DOCUMENTS

| | | |
|---|---|---|
| KR | 10-2019-0016802 | 2/2019 |
| KR | 10-2019-0028027 | 3/2019 |
| KR | 10-2019-0111769 | 10/2019 |

OTHER PUBLICATIONS

European Patent Office Application Serial No. 21952915.3, Search Report dated May 12, 2025, 8 pages.

* cited by examiner

Figure 6:
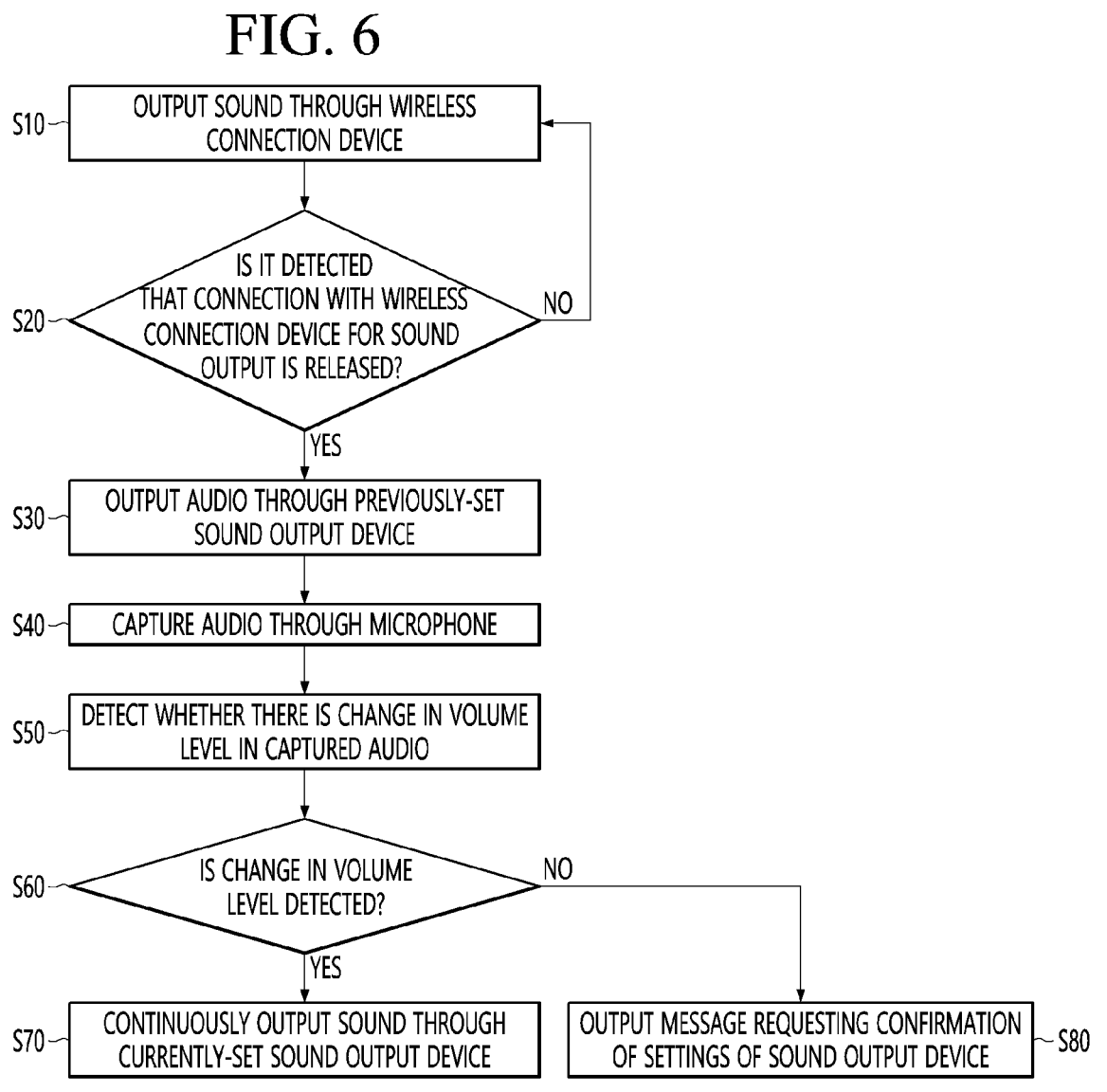

S10 — OUTPUT SOUND THROUGH WIRELESS CONNECTION DEVICE

S20 — IS IT DETECTED THAT CONNECTION WITH WIRELESS CONNECTION DEVICE FOR SOUND OUTPUT IS RELEASED?    NO

YES

S30 — OUTPUT AUDIO THROUGH PREVIOUSLY-SET SOUND OUTPUT DEVICE

S40 — CAPTURE AUDIO THROUGH MICROPHONE

S50 — DETECT WHETHER THERE IS CHANGE IN VOLUME LEVEL IN CAPTURED AUDIO

S60 — IS CHANGE IN VOLUME LEVEL DETECTED?    NO

YES

S70 — CONTINUOUSLY OUTPUT SOUND THROUGH CURRENTLY-SET SOUND OUTPUT DEVICE

OUTPUT MESSAGE REQUESTING CONFIRMATION OF SETTINGS OF SOUND OUTPUT DEVICE — S80

S40

| S41 | DETERMINE WHETHER MICROPHONE-ON-TRIGGER CONDITION IS SATISFIED |

| S43 | CONTROL MICROPHONE TO BE TURNED ON WHEN MICROPHONE-ON-TRIGGER CONDITION IS SATISFIED |

| S45 | OBTAIN AUDIO THROUGH MICROPHONE |

S50

S51 — | COMPARE FIRST AUDIO INPUT TO DISPLAY DEVICE WITH SECOND AUDIO CAPTURED BY MICROPHONE |

S53 — | FILTER THIRD AUDIO TO EXCLUDE AMBIENT NOISE |

S55 — | DETECT CHANGE IN VOLUME LEVEL OF THIRD AUDIO |

FIG. 9
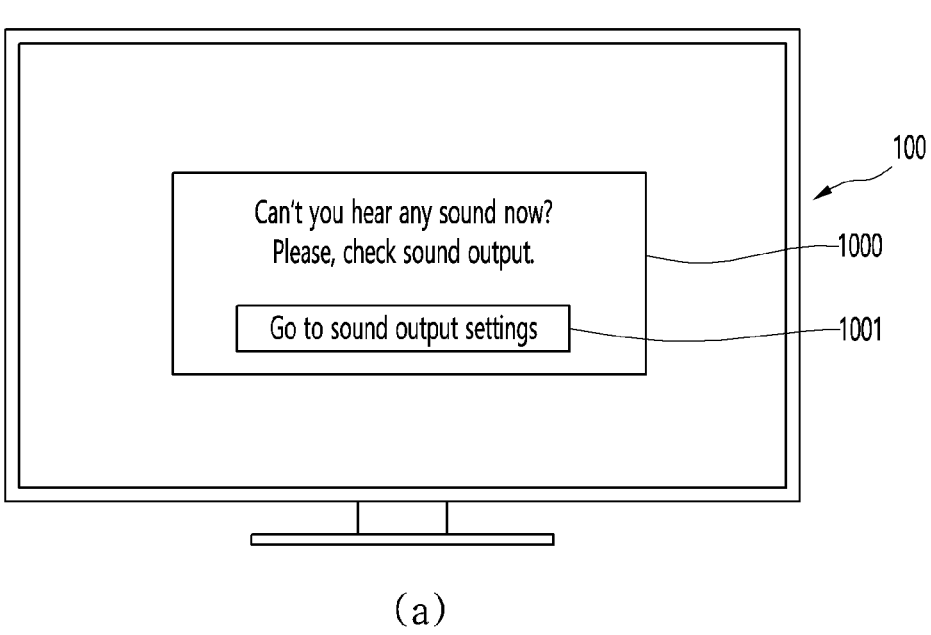
(a)
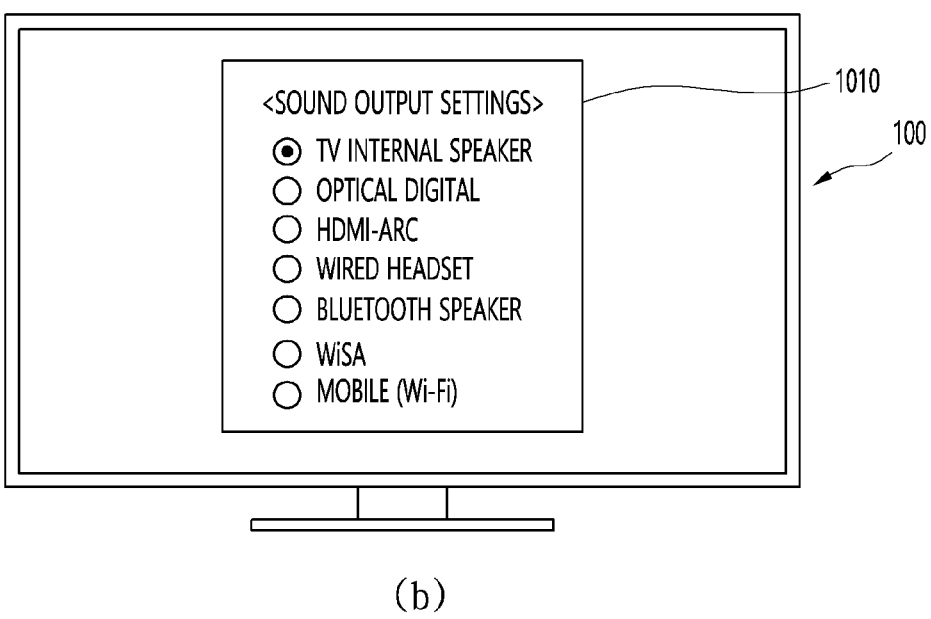
(b)

DISPLAY APPARATUS AND OPERATING METHOD THEREFOR

CROSS-REFERENCE TO RELATED APPLICATION(S)

This application is the National Stage filing under 35 U.S.C. 371 of International Application No. PCT/KR2021/010047, filed on Aug. 2, 2021, the contents of which is hereby incorporated by reference herein in its entirety.

TECHNICAL FIELD

The present disclosure relates to a display device and an operation method thereof. More specifically, the present disclosure relates to technology for solving problems that occur when a sound output device is changed in a display device.

BACKGROUND ART

As high-quality audio devices become more diverse and users become more interested in sound quality and vibrant surround sound, users are increasingly using not only speakers provided in the display device itself but also connecting separate audio devices wirelessly or wired.

On the other hand, when a user wants to connect and use a separate audio device, the user does not know that the audio device is not properly connected to a display device, and sets the sound to be output from the separate audio device, but the sound is not output, causing a case in which the user is mistaken for a defect in a display device.

For example, when a wirelessly connected audio device, such as a Bluetooth speaker, is set as a sound output device, the wireless connection is released and the sound output device is changed to the previously set sound bar, but the sound bar is in standby mode or turned off and sound is not output, it is difficult for users to recognize this condition, leading to a problem where a user may mistakenly believe that the display device is detective.

DISCLOSURE OF INVENTION

Technical Problem

The present disclosure aims to solve the above-mentioned problems.

The present disclosure aims to solve a problem of being mistaken for a defect in a display device when sound is not output when sound output device is changed.

The present disclosure aims to solve a problem in which sound is not output when a sound output device is switched to a previously set sound output device without being unconditionally switched to an internal speaker after sound is output from a wirelessly connected audio device and the connection is then terminated.

Technical Solution

According to an embodiment of the present disclosure, a display device includes a display which outputs an image, an audio output unit which outputs sound according to the image through an internal speaker, a wired connection device, or a wireless connection device, and a control unit which obtains audio through a microphone when a connection with the wireless connection device is released, and outputs a message requesting confirmation of settings of the sound output device on the basis of a change in audio volume level.

The control unit may output a message requesting to check the settings of the sound output device when there is no change in the volume level of the audio.

The control unit may acquire the audio by performing control such that the microphone is turned on when the connection with the wireless connection device is released and the sound output device is set to the wired connection device.

The control unit may perform control such that the microphone is turned on when the sound output device switches from the wireless connection device to the wired connection device.

The control unit may perform control such that the microphone is turned on when a command for changing a volume level is received from a remote control device after the connection with the wireless connection device is released.

The control unit may acquire the audio including a section for changing the volume level according to a command for changing a volume level, which is received from a remote control device after the microphone is turned on.

The control unit may automatically change the volume level in a gradual manner after the microphone is turned on and acquire the audio including a section in which the volume level is changed.

The control unit may filter a third audio to exclude ambient noise by comparing a first audio input along with the image with a second audio acquired through the microphone, and output a message requesting to check settings of the sound output device based on a change in volume level of the third audio.

The control unit may not re-output the message until there is a change in the settings of the sound output device after the message is output.

The control unit may acquire the audio through at least one of an internal microphone and a microphone provided in a remote control device.

Advantageous Effects

According to an embodiment of the present disclosure, it is possible to quickly resolve a problem in which no sound is output by guiding a user to check the settings of a sound output device when the sound output device is changed, thereby minimizing a problem in which a user mistakenly believes that it is a defect in the display device.

According to an embodiment of the present disclosure, it is possible to switch a sound output device to a previously-set device when sound is output from a wirelessly connected audio device and the wireless connection is then terminated, thereby eliminating a problem in which the sound output device unconditionally switches to an internal speaker.

According to an embodiment of the present disclosure, it is possible to output a message requesting to check the settings of the sound output device only when there is no change in the volume level of the audio acquired through the microphone, without unconditionally outputting the message when the sound output device is changed, thereby minimizing user inconvenience caused by unnecessarily outputting the message.

BRIEF DESCRIPTION OF DRAWINGS

FIG. 1 is a block diagram illustrating a configuration of a display device according to an embodiment of the present disclosure.

FIG. 6 is a flowchart illustrating a method of operating a display device according to an embodiment of the present disclosure.

FIG. 9 is an example diagram illustrating a method of outputting a message requesting to check settings of a sound output device in a display device, according to an embodiment of the present disclosure.

BEST MODE FOR CARRYING OUT THE INVENTION

Figure 2:
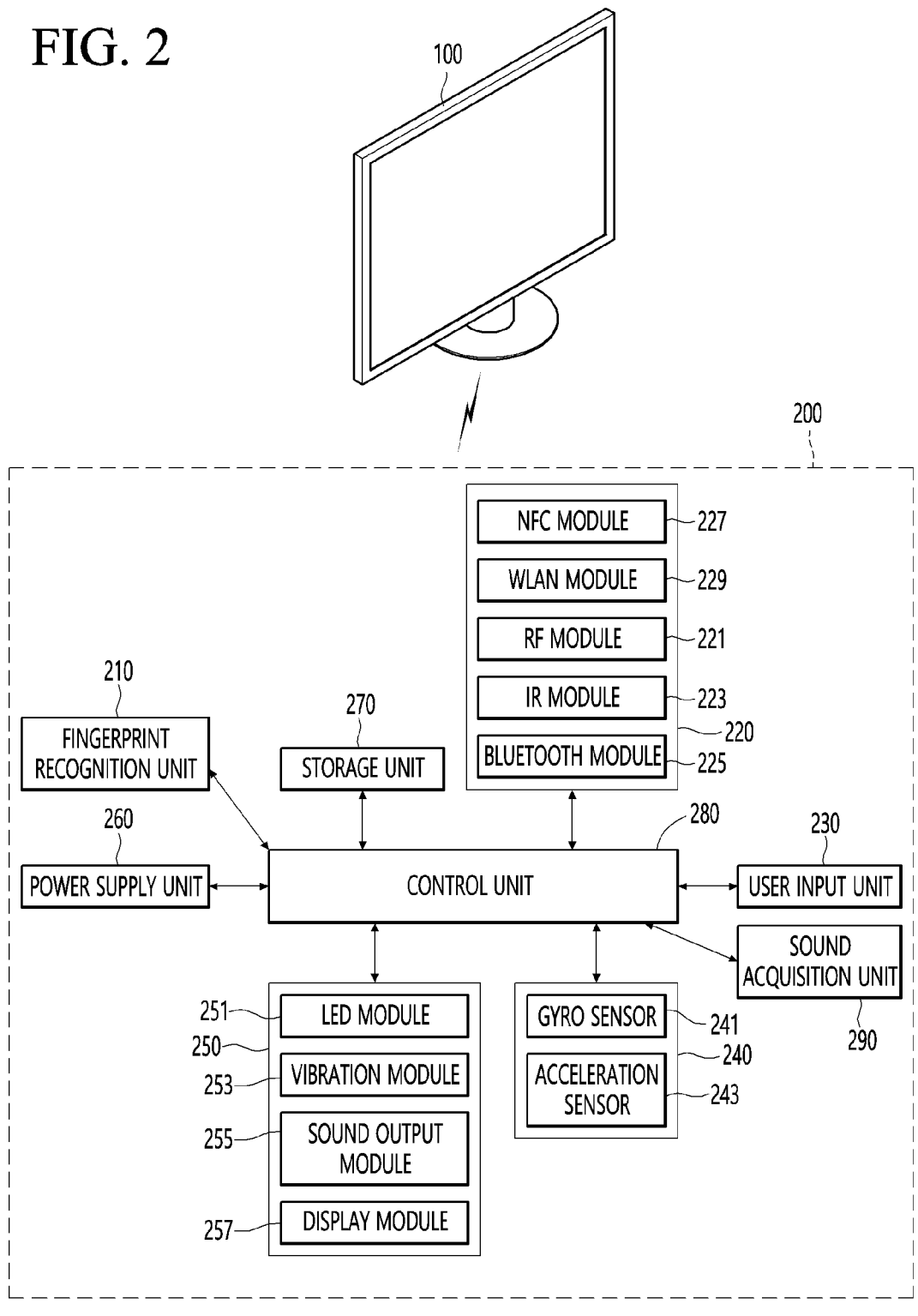
FIG. 2 is a block diagram illustrating a remote control device according to an embodiment of the present disclosure.

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
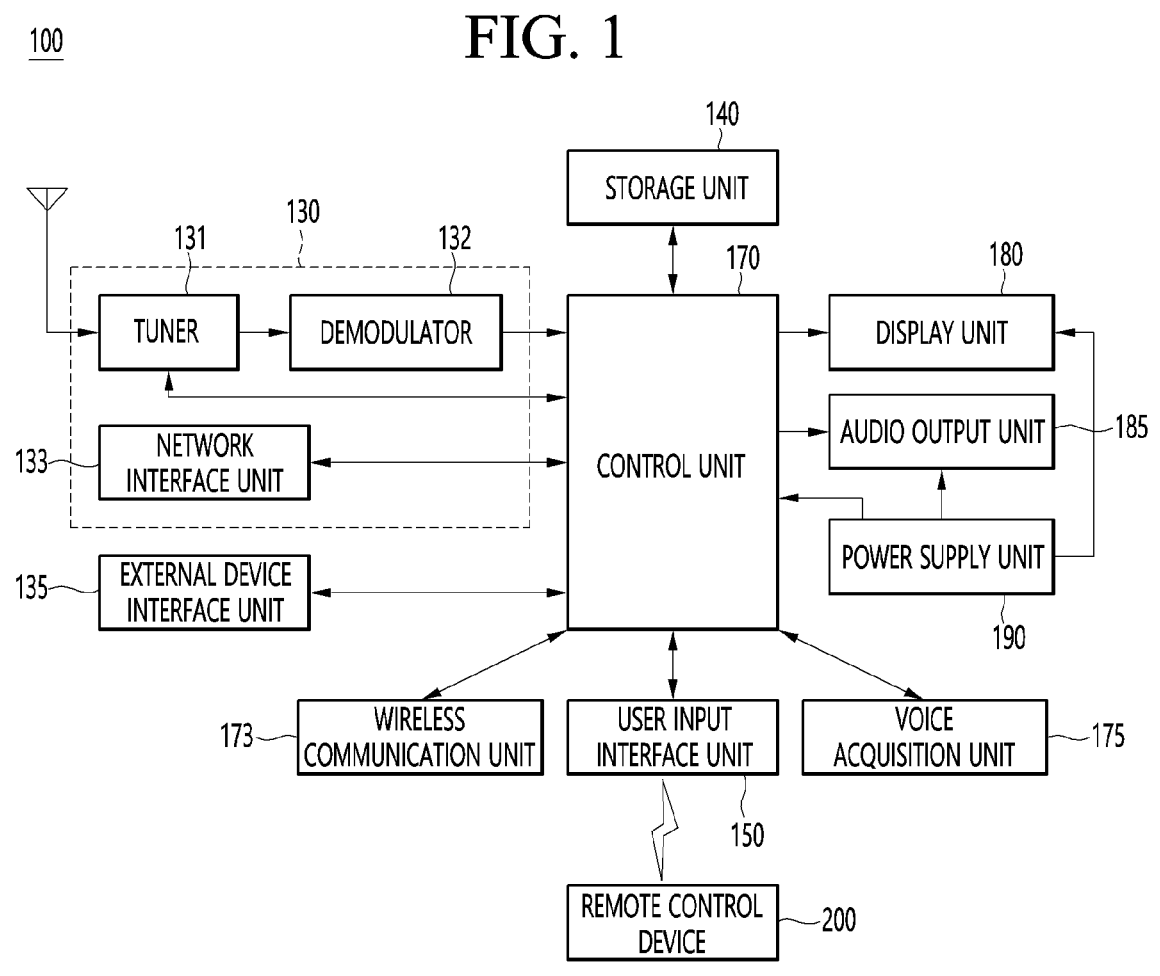

FIG. 1 is a block diagram illustrating a configuration of a display device according to an embodiment of the present disclosure.

Referring to FIG. 1, a display device 100 may include a broadcast reception module 130, an external device interface unit 135, a storage unit 140, a user input unit 150, a control unit 170, a wireless communication interface unit 173, a display unit 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator. That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not shown) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100

(or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not shown) and may acquire audio around the display device 100 through the microphone (not shown).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

A remote control device according to an embodiment of the present disclosure will be described with reference to FIGS. 2 and 3.

Figure 3:
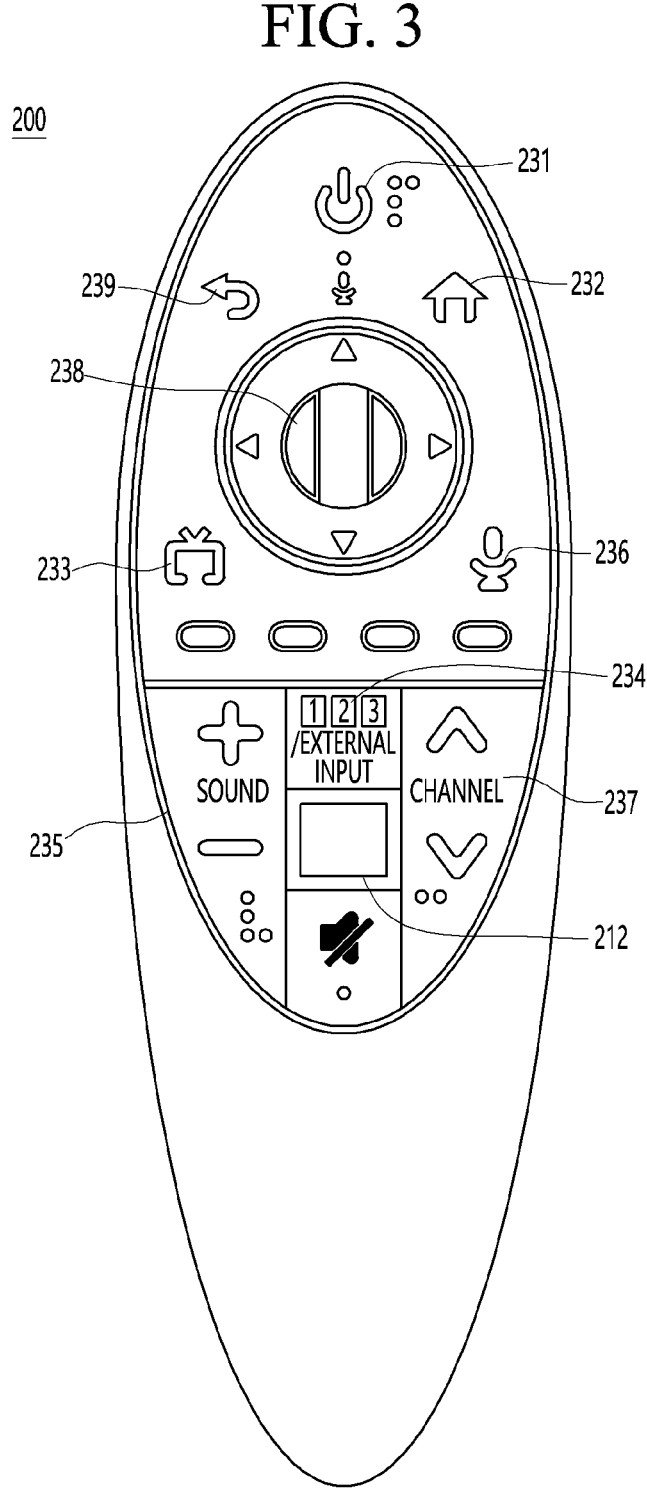
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication unit 220, a user input unit 230, a sensor unit 240, an output unit 250, a power supply unit 260, a storage unit 270, a control unit 280, and a sound acquisition unit 290.

Referring to FIG. 2, the wireless communication unit 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication unit 220.

Moreover, the remote control device 200 may receive signals transmitted from the display device 100 through the RF module 221 and if necessary, may transmit a command for power on/off, channel change, and volume change to the display device 100 through the IR module 223.

The user input unit 230 may be configured with a keypad, a button, a touch pad, or a touch screen. A user may operate the user input unit 230 to input a command relating to the display device 100 to the remote control device 200. If the user input unit 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input unit 230 includes a touch screen, a user may touch a soft key of the touch screen to input a command relating to the display device 100 to the remote control device 200. In addition, the user input unit 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display unit 180 of the display device 100.

The output unit 250 may output image or voice signals in response to the operation of the user input unit 230, or may output image or voice signals corresponding to signals transmitted from the display device 100. A user may recognize whether the user input unit 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input unit 230 is manipulated or signals are transmitted/received to/from the display device 100 through the wireless communication unit 220.

Additionally, the power supply unit 260 supplies power to the remote control device 200 and if the remote control device 200 does not move for a predetermined time, stops the power supply, so that power waste may be reduced. The power supply unit 260 may resume the supply of power if a predetermined key provided at the remote control device 200 is operated.

The storage unit 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 may store, in the storage unit 270, information on a frequency band for transmitting/receiving signals to/from the display device 100 paired with the remote control device 200 and refer to it.

The control unit 280 controls general matters relating to the control of the remote control device 200. The control unit 280 may transmit a signal corresponding to a predetermined key operation of the user input unit 230 or a signal corresponding to the movement of the remote control device 200 sensed by the sensor unit 240 to the display device 100 through the wireless communication unit 220.

In addition, the sound acquisition unit 290 of the remote control device 200 may acquire voice.

The sound acquisition unit 290 may include at least one microphone and acquire voice through the microphone.

Figure 4:
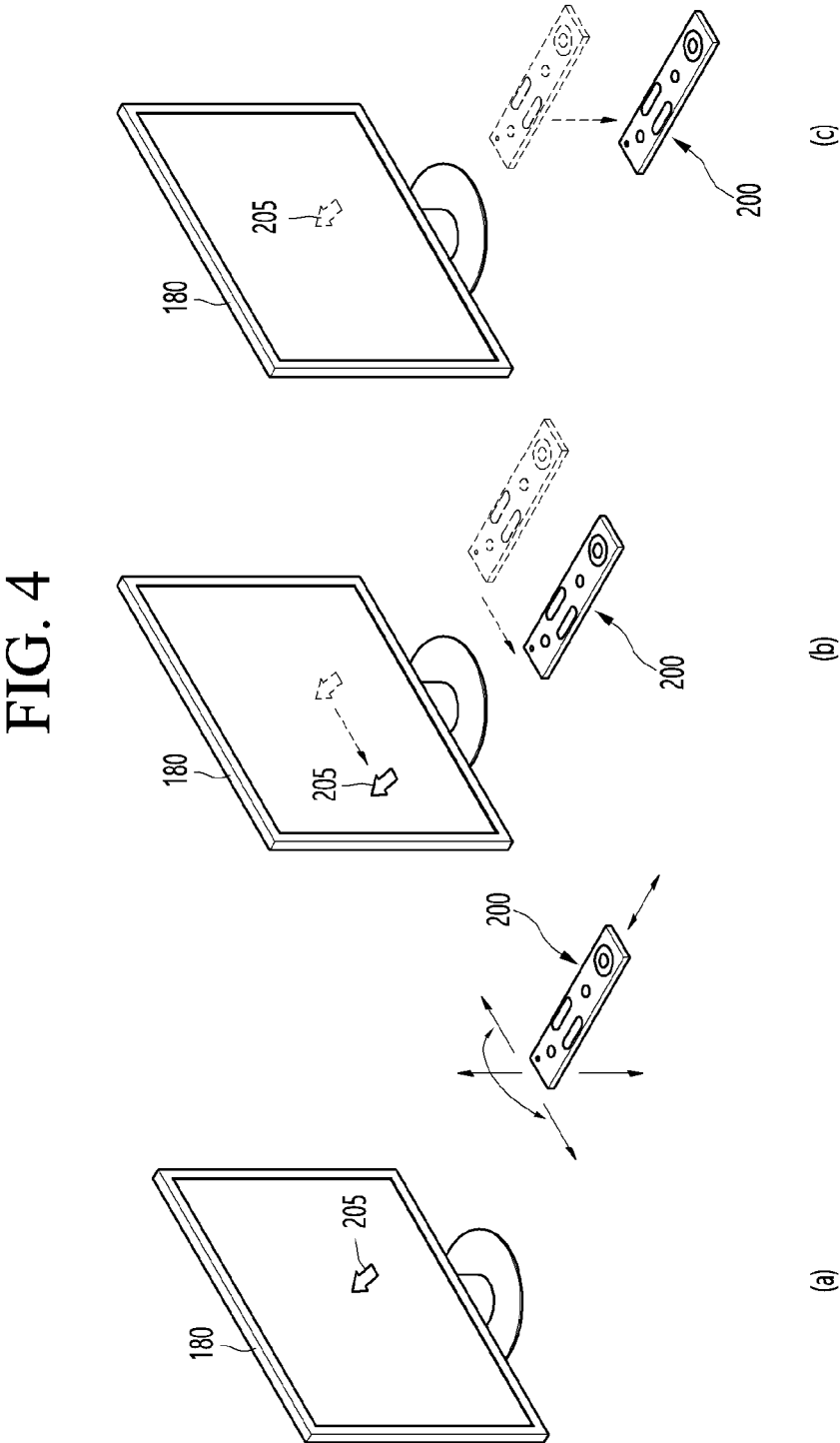
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display unit 180.

A user may move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display unit 180. Thus, a selected region in the display unit 180 corresponding to the pointer 205 may be zoomed in and displayed in an enlarged size.

On the other hand, if a user moves the remote control device 200 close to the display unit 180, a selection area in the display unit 180 corresponding to the pointer 205 may be zoomed out and displayed in a reduced size.

On the other hand, if the remote control device 200 is moved away from the display unit 180, a selection area may be zoomed out and if the remote control device 200 is moved closer to the display unit 180, a selection area may be zoomed in.

Additionally, if a specific button in the remote control device 200 is pressed, recognition of a vertical or horizontal movement may be excluded. That is, if the remote control device 200 is moved away from or closer to the display unit 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display unit 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display unit 180 and also may be displayed in correspondence to a plurality of points such as a line and a surface.

Meanwhile, the display device 100 may output sound through various audio devices. Specifically, the display device 100 may output sound through at least one of an internal speaker provided in the display device 100 itself, a wired connected audio device, and a wireless connected audio device.

Figure 5:
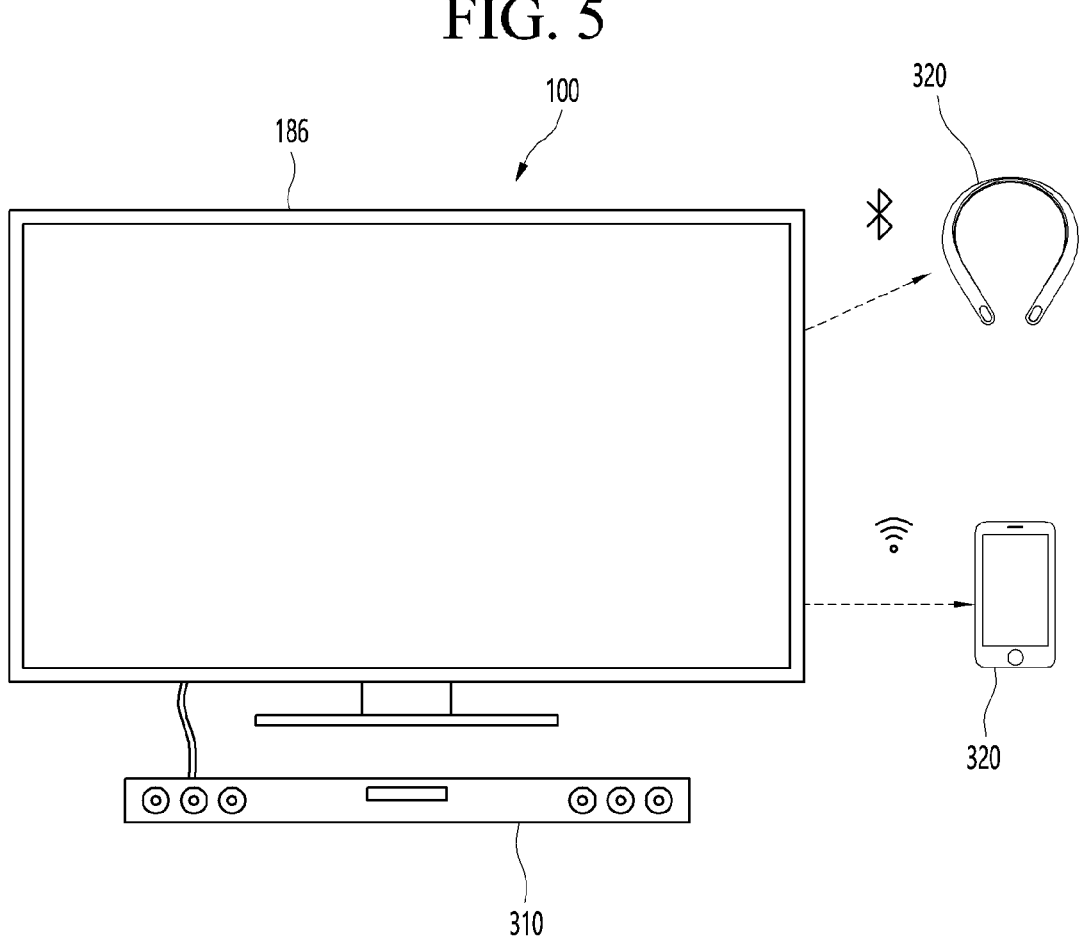
FIG. 5 is a diagram illustrating a method of outputting sound in a display device according to an embodiment of the present disclosure.

FIG. 5 is an example diagram illustrating various methods of outputting sound in a display device according to an embodiment of the present disclosure.

The display device 100 itself may be equipped with a speaker, which may be referred to as an internal speaker 186. According to the type of display device 100, the internal speaker 186 may be installed on the front or back of the display 180 and may be placed in at least one of the lower, upper, left, or right side of the display 180, which are merely examples.

The display device 100 may be connected to an audio device in a wired manner through optical digital, HDMI-ARC, or the like and the device connected in this manner may be referred to as a wired connection device 310. An example of the wired connection device 310 is a sound bar, but this is only an example and may include a headset, or the like.

The display device 100 may be connected to an audio device in a wireless manner the control unit through Bluetooth, Wi-Fi, WiSA, or the like and the device connected in this manner may be referred to as a wireless connection device 320. Examples of the wireless connection device 310 may include a headset, a smartphone, a Bluetooth speaker, or the like, but this is only an example, and therefore, the device is not limited thereto.

The audio output unit 185 may receive a voice signal processed to be output together with an image and output the voice signal through at least one of the internal speaker, the wireless connection device, and the wired connection device. That is, the audio output unit 185 may output sound according to the image through the internal speaker, the wired connection device, or the wireless connection device.

The control unit 170 may receive an input for setting a device from which sound is to be output among the internal speaker, the wired connection device, and the wireless connection device. The device that is set to output sound may be referred to as a sound output device.

Meanwhile, terms such as the internal speaker, the wireless connection device, the wired connection device, and sound output device are merely names for convenience of description, so it is reasonable to not be limited to these names.

The control unit 170 may receive a command for setting a sound output device. The control unit 170 may control the audio output unit 185 to output sound through a set sound output device.

Meanwhile, when the display device 100 is not connected to a wired connection device or a wireless connection device, a user may set a sound output device to the wired connection device or the wireless connection device. Accordingly, when sound is not output, a problem occurs that the user mistakenly believes that it is a defect in the display device 100. In particular, when the connection with the wireless connection device is terminated while the wireless connection device is set as the sound output device, the control unit 170 may switch the sound output device to a previously-set sound output device. When the power of the wired connected device is turned off, a problem may occur in which sound is not output. Additionally, the user may not think of a power problem with the wired connection device and may mistakenly believes that it is a defect in the display device 100. Accordingly, when the connection with the wireless connection device connected to the display device 100 is terminated, the wired connection device may be set as the sound output device, thereby eliminating the inconvenience caused by no sound output.

On the other hand, there is a method in which the control unit 170 unconditionally switches the sound output device to the internal speaker when the connection with the wireless connection device is terminated. In the most cases, the wireless connection device is intended for temporary use, and the internal speaker or wired connection device is intended for continuous use, so that an audio device intended for main use is changed to a sound output device, thereby solving the inconvenience of no sound.

FIG. 6 is a flowchart illustrating a method of operating a display device according to an embodiment of the present disclosure.

The control unit 170 may output sound through a wireless connection device (S10).

That is, when the sound output device is output as a wireless connection device, the control unit 170 may output sound through an audio device wirelessly connected to the display device 100.

The control unit 170 may detect whether the connection with the wireless connection device for sound output is released (S20).

The control unit 170 may detect whether the connection with the wireless connection device is released when sound is being output through the wireless connection device.

When the connection with the wireless connection device is not disconnected, the control unit 170 may continuously output sound through the wireless connection device.

When the control unit 170 detects that the connection with the wireless connection device is released, the control unit 170 may output audio through a previously set sound output device (S30).

In addition, the control unit 170 may capture audio through a microphone (S40).

In particular, when the connection with the wireless connection device is released and the sound output device is set to a wired connection device, the control unit 170 may control the microphone to be turned on to obtain audio.

The microphone may include at least one of an internal microphone provided in the display device 100 itself and a microphone provided in the remote control device 200. That is, the control unit 170 may acquire audio through at least one of the internal microphone and the microphone provided in the remote control device 200.

Figure 7:
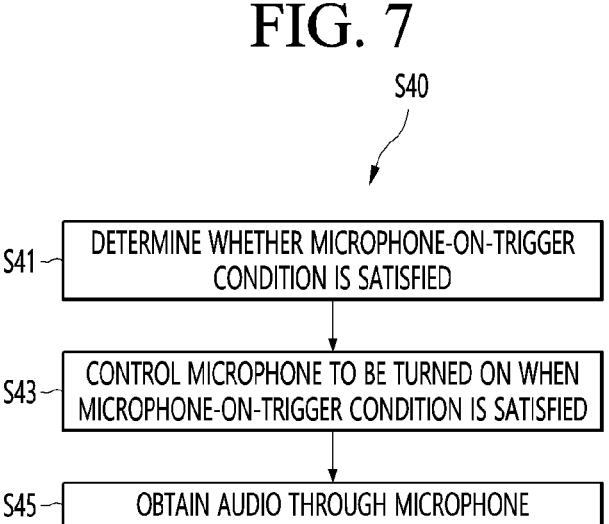
FIG. 7 is a flowchart illustrating a method of controlling a microphone to be turned on in a display device according to an embodiment of the present disclosure.

Meanwhile, the timing for controlling the microphone to be turned on may vary. Accordingly, the control unit 170 may determine whether a microphone-on-trigger condition is satisfied and turn on the microphone when the condition is satisfied. Referring to FIG. 7, a specific method of turning on a microphone will be described.

FIG. 7 is a flowchart illustrating a method of controlling a microphone to be turned on in a display device according to an embodiment of the present disclosure.

FIG. 7 may be a flowchart showing a specific method of performing step S40 of FIG. 6.

The control unit 170 may determine whether the microphone-on-trigger condition is satisfied (S41).

When the microphone-on-trigger condition is satisfied, the control unit 170 may control the microphone to be turned on (S43).

The microphone-on-trigger condition may be a condition for enabling the microphone.

A first condition for enabling a microphone may be a condition that a sound output device is switched from a wireless connection device to a wired connection device. Accordingly, the control unit 170 may control the microphone to be turned on when the sound output device is switched from a wireless connection device to a wired connection device.

A second condition for enabling a microphone may be a condition that a command for changing a volume level is received from the remote control device 200 after the connection with the wireless connection device is released. The control unit 170 may control the microphone to be turned on when receiving the command for changing a volume level from the remote control device 200 after the connection with the wireless connection device is released.

The control unit 170 may control the microphone to be turned on and then acquire audio through the microphone (S45).

According to a first embodiment, the control unit 170 may turn on the microphone and acquire audio recorded for a predetermined period of time. That is, when it is assumed that the user turn up the volume level by herself or himself when sound is not output in the first embodiment, the display device 100 may acquire audio through the microphone without separately adjusting the volume level. Accordingly, the control unit 170 may acquire audio recorded for a predetermined period of time after the microphone is turned on. Accordingly, the audio may include a section in which the volume level is changed according to the command for changing the volume level, which is received from the remote control device 200. That is, the control unit 170 may acquire audio including a section in which the volume level is changed according to the command for changing the volume level, which is received from the remote control device 200 after the microphone is turned on.

According to a second embodiment, the control unit 170 may turn on the microphone and acquire audio recorded while adjusting the volume level. That is, in the second embodiment, the display device 100 may acquire audio through the microphone while the display device 100 itself is adjusting the volume level to determine whether sound is output. Accordingly, the control unit 170 may automatically change the volume level in a gradual manner after the microphone is turned on and acquire audio including a section in which the volume level is changed.

Again, details will be described with reference to FIG. 6.

The control unit 170 may detect whether the volume level changes in captured audio (S50).

When the connection of the wireless connection device is terminated and the sound output device is changed, causing a problem in which the sound is not output, there may be no change in volume level, so that the control unit 170 may attempt to determine whether or not the sound is output based on whether the volume level of the audio changes.

According to the first embodiment, the control unit 170 may detect whether the volume level changes in the captured audio itself.

Meanwhile, audio may include not only sound output from a sound output device but also ambient noise. Accordingly, a problem may occur in which a change in volume level is detected in the audio due to a change in noise level even though no sound is output. Accordingly, it is possible to detect whether the volume level has changed by perform filtering to acquire only audio from which noise has been removed.

Meanwhile, according to the second embodiment, the control unit 170 may detect whether the volume level changes by performing filtering to acquire audio from which noise has been removed.

Figure 8:
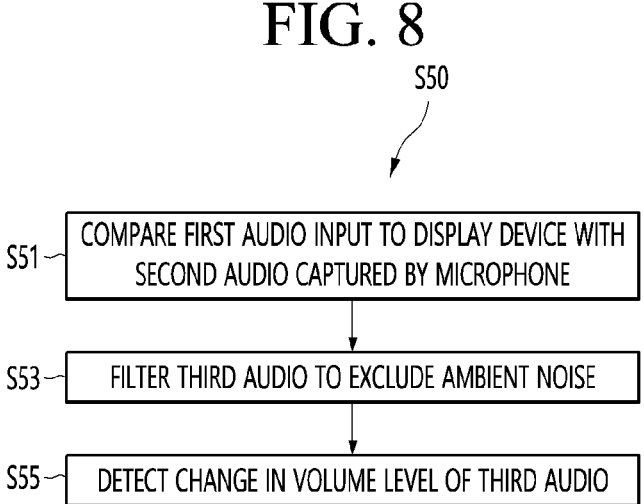
FIG. 8 is a flowchart illustrating a method of filtering audio and detecting whether a volume level changes in a display device, according to an embodiment of the present disclosure.

FIG. 8 is a flowchart illustrating a method of filtering audio and detecting whether a volume level changes in a display device, according to an embodiment of the present disclosure.

FIG. 8 may be an embodiment embodying step S50 of FIG. 6.

The control unit 170 may compare first audio input to the display device 100 and second audio captured by the microphone (S51).

The first audio may be audio input along with an image, and the second audio may be audio acquired through a microphone in step S40.

The control unit 170 may filter third audio to exclude ambient noise, using the first and second audio (S53).

The control unit 170 may compare the first audio and the second audio and filter third audio to exclude ambient noise. Specifically, the control unit 170 may acquire ambient noise by removing the first audio from the second audio, and then acquire the third audio by removing the ambient noise from the second audio.

The control unit 170 may detect a change in the volume level of the third audio (S55).

The control unit 170 may recognize the third audio as audio acquired by recording sound output from a sound output device. Accordingly, the control unit 170 may detect a change in the volume level of the third audio and output a message requesting to check settings of the sound output device based on the change in the volume level of the second audio.

Again, details will be described with reference to FIG. 6.

When the control unit 170 detects a change in volume level, the control unit 170 may continuously output audio through a sound output device currently set (S70).

When a change in volume level is detected, the control unit 170 may determine that sound is being output, and accordingly continue to output sound through the currently set sound output device.

Meanwhile, when a change in volume level is not detected, the control unit 170 may output a message requesting to check the settings of the sound output device (S80).

When no change in volume level is detected, the control unit 170 may determine a state in which no sound is output, that is, a sound non-output state. Accordingly, the control unit 170 may output a message requesting to check the settings of the sound output device.

A message requesting to check the settings of the sound output device may include, for example, text such as "Check whether current sound output settings are set properly," but this is only illustrative.

FIG. 9 is an example diagram illustrating a method of outputting a message requesting to check settings of a sound output device in a display device, according to an embodiment of the present disclosure.

The control unit 170 may output a pop-up 1000 as shown in (a) of FIG. 9, and the pop-up 100 may include text such as "Can't you hear any sound now? Please, check sound output."

Additionally, according to an embodiment, the pop-up 1000 may further include an icon 1001 for moving to a sound output setting menu. The control unit 170 may display an icon 1001 guiding the user to the sound output setting menu along with a message requesting to check the settings of the sound output device.

When the control unit 170 receives a command for selecting the icon 1001, the control unit 170 may display a menu 1010 for receiving selection for a sound output device as shown in (b) of FIG. 9. When a specific device is selected in the menu 1010, the control unit 170 may set the selected device as a sound output device.

Meanwhile, after outputting a message, the control unit 170 may not re-output the message until there is a change in the settings of the sound output device. This is because the user may suddenly increase the volume level for other reasons, the message is output only once, thereby minimizing user inconvenience.

In summary, when the connection with the wireless connection device is released, the control unit 170 may acquire audio through the microphone and output a message requesting to check the settings of the sound output device based on the change in the volume level of the audio.

In addition, the display device 100 may output a message in this way, which has the advantage of guiding the user to quickly recognize the cause of the sound non-output state.

The present disclosure described above may be embodied as computer readable codes on a medium in which a program is recorded. The computer-readable medium includes all kinds of recording devices in which data readable by a computer system is stored. Examples of the computer readable medium may include a hard disk drive (HDD), a solid state disk (SSD), a silicon disk drive (SDD), a ROM, a RAM, a CD-ROM, a magnetic tape, a floppy disk, an optical data storage device, and the like. The computer may also include the control unit 170 of the display device 100. Accordingly, the above detailed description should not be construed as restrictive in all respects and should be considered illustrative. The scope of this specification should be determined by reasonable interpretation of the appended claims, and all changes within the equivalent scope of this specification are included in the scope of this specification.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present disclosure is not intended to limit the technical idea of the present disclosure but to describe the present disclosure, and the scope of the technical idea of the present disclosure is not limited by the embodiment.

The scope of protection of the present disclosure should be interpreted by the following claims, and all technical ideas within the scope equivalent thereto should be construed as being included in the scope of the present disclosure.

What is claimed is:

1. A display device comprising:
a display which outputs an image;
a sound output device which outputs sound according to the image through an internal speaker, a wired connection device, or a wireless connection device based on settings of the sound output device; and
a control unit configured to:
turn on a microphone connected to the display device when a connection with the wireless connection device is released, obtain audio output from the sound output device through the microphone for a predetermined period of time based on the connection with the wireless connection device being released, and output a message requesting confirmation of the settings of the sound output device when there is no change in an audio volume level of the audio obtained through the microphone.

2. The display device of claim 1, wherein the control unit is further configured to:

display a menu for receiving selection of the sound output device, receive a command for selecting an icon of the menu, and set the selected sound output device.

3. The display device of claim 1, wherein the controller is configured to perform control such that the microphone is turned on when the connection with the wireless connection device is released and the sound output device is set to the wired connection device, and acquire the audio recorded for the predetermined period of time including a section in which the audio volume level is changed according to a command for changing the audio volume level.

4. The display device of claim 3, wherein the control unit is configured to perform control such that the microphone is turned on when the sound output device switches from the wireless connection device to the wired connection device.

5. The display device of claim 3, wherein the control unit is configured to perform control such that the microphone is turned on when a command for changing a volume level is received from a remote control device after the connection with the wireless connection device is released.

6. The display device of claim 1, wherein the control unit is configured to acquire the audio including a section for changing the audio volume level according to a command for changing a volume level, which is received from a remote control device after the microphone is turned on.

7. The display device of claim 1, wherein the control unit is configured to automatically change the audio volume level in a gradual manner after the microphone is turned on and acquire the audio including a section in which the audio volume level is changed.

8. The display device of claim 1, wherein the control unit is configured to filter a third audio to exclude ambient noise by comparing a first audio input along with the image to the display device with a second audio acquired through the microphone, and output a message requesting confirmation of the settings of the sound output device when there is no change in the audio volume level of the third audio.

9. The display device of claim 1, wherein the control unit is configured not to re-output the message until there is a change in the settings of the sound output device after the message is output.

10. The display device of claim 1, wherein the microphone includes at least one of an internal microphone or a microphone provided in a remote control device, and the control unit is configured to acquire the audio through at least one of the internal microphone or the microphone provided in the remote control device.

\*   \*   \*   \*   \*